United States Patent [19]

Davis, Jr.

[11] Patent Number: 4,839,479

[45] Date of Patent: Jun. 13, 1989

[54] ARTICLE USING SHAPE-MEMORY ALLOY TO IMPROVE AND/OR CONTROL THE SPEED OF RECOVERY

[76] Inventor: Thomas O. Davis, Jr., 1950 Camino Redondo, Los Alamos, N. Mex. 87544

[21] Appl. No.: 220,781

[22] Filed: Jul. 18, 1988

Related U.S. Application Data

[60] Division of Ser. No. 58,886, Jun. 17, 1987, Pat. No. 4,759,293, which is a continuation-in-part of Ser. No. 880,022, Jun. 20, 1986, Pat. No. 4,704,968.

[51] Int. Cl.[4] .................... H01H 35/14; H01H 37/16; G01V 1/16

[52] U.S. Cl. .............................. 200/61.45 R; 337/140; 337/393; 337/394

[58] Field of Search ........................ 102/520, 521, 532; 200/61.45 R, 61.53; 337/140, 298, 393, 394

[56] References Cited

U.S. PATENT DOCUMENTS

| | | | |
|---|---|---|---|
| 3,012,882 | 12/1961 | Muldawer et al. | 148/402 |
| 3,173,371 | 3/1965 | Manshel | 102/507 |
| 3,174,851 | 3/1965 | Buehler et al. | 148/426 |
| 3,285,470 | 11/1966 | Frei et al. | 148/402 |
| 3,351,463 | 11/1967 | Rozner et al. | 148/426 |
| 3,430,572 | 3/1969 | Hebert et al. | 102/521 |
| 3,558,369 | 1/1971 | Wang et al. | 148/11.5 R |
| 3,652,969 | 3/1972 | Willson et al. | 337/393 |
| 3,672,879 | 6/1972 | Buehler | 420/441 |
| 3,714,900 | 2/1973 | Feldmann | 102/522 |
| 3,725,835 | 4/1973 | Hopkins et al. | 337/393 |
| 3,771,458 | 11/1973 | Schweimler et al. | 102/523 |
| 3,861,314 | 1/1975 | Barr | 102/501 |
| 3,866,536 | 2/1975 | Greenberg | 102/510 |
| 3,872,415 | 3/1975 | Clarke | 337/140 |
| 3,956,989 | 5/1976 | Sallade et al. | 102/491 |
| 3,994,752 | 11/1976 | Hayes | 102/494 |
| 4,002,123 | 1/1977 | Fisher | 102/226 |
| 4,212,208 | 7/1980 | Weale et al. | 200/61.45 R |
| 4,245,557 | 1/1981 | Knappworst et al. | 102/517 |
| 4,338,862 | 7/1982 | Kwatnoski et al. | 102/516 |
| 4,365,996 | 12/1982 | Melton et al. | 148/402 |
| 4,416,630 | 11/1983 | Hagen et al. | 42/1.05 |
| 4,534,294 | 8/1985 | von Laar et al. | 102/520 |
| 4,551,974 | 11/1985 | Yeager et al. | 337/393 |
| 4,594,485 | 6/1986 | Brown | 200/61.53 |
| 4,654,092 | 3/1987 | Melton | 148/402 |
| 4,704,968 | 11/1987 | Davis | 102/517 |

OTHER PUBLICATIONS

Buehler, William J. and Cross, William B., "55 Nitinol—Unique Wire Alloy with a Memory", Jun., 1969, Wire Journal.

Jackson, C. M., Wagner, H. J., and Wasilewski, R. J., "55-Nitinol—The Alloy with a Memory: Its Physical Metallurgy, Properties, and Applications", 1972. National Aeronautics and Space Administration Schetky, L. McDonald, "Shape-Memory Alloys".

*Primary Examiner*—David H. Brown

*Attorney, Agent, or Firm*—Burns, Doane, Swecker & Mathis

[57] ABSTRACT

An article in the form of a projectile, a shock-sensitive switch or a sabot having an active component of shape-memory alloy which exhibits the shape-memory effect to provide a mechanical movement in response to a pressure wave passing through the article is disclosed. A thermal enhancement component which rapidly generates heat to initiate the shape-memory effect is also disclosed.

6 Claims, 4 Drawing Sheets

ARTICLE USING SHAPE-MEMORY ALLOY TO IMPROVE AND/OR CONTROL THE SPEED OF RECOVERY

This application is a divisional of U.S. patent application Ser. No. 058,886, filed June 17, 1987, now U.S. Pat. No. 4,759,293, which is in turn a continuation-in-part of U.S. patent application Ser. No. 880,022 filed June 30, 1986, now U.S. Pat. No. 4,704,968.

BACKGROUND OF THE INVENTION

The present invention relates to articles that employ shape-memory alloy which exhibits the shape-memory effect as a motive mechanism when exposed to a pressure wave, as well as to thermal enhancement means to improve and/or control the speed of recovery of the shape-memory alloy, i.e., to initiate the shape-memory effect.

Articles can be adapted to a variety of uses wherein the basic theory of impact mechanics is applicable. Naturally, the theory is easiest to explain using projectiles as examples. Other applications deal with one or more axis acceleration detectors which are useful in vehicles or stationary objects experiencing shock.

Using projectiles as an example, and with improving the impact energy transfer efficiency of projectiles being the goal, the following description provides a background of the invention.

Projectiles in the form of conventional bullets remain intact upon striking a soft target to cause a single wound tract. While conventional bullets may expand or tumble after impacting the soft target in order to increase the lethality of the bullet, the bullet will frequently start its expanding or tumbling action only after much of the target has been penetrated. Prior art methods for improving impact energy transfer efficiency, and thus bullet lethality, generally involve alteration of the external configuration of the bullet to the shapes of "hollow-point", "off-center punch", "spoon nose" and the like.

U.S. Pat. Nos. 3,173,371; 3,861,314 and 4,338,862 disclose various attempts to alter the performance of a projectile by altering its external configuration to promote instability upon impact, or by altering the internal configuration of the projectile through the use of passive elements such as a disc or a low-density filler material. None of the prior art devices discloses a projectile having an active means to improve and/or control the impact energy transfer efficiency of the projectile. By the word "active" it is meant that the means has stored energy which will act as a motive mechanism. The prior art devices are "passive" in that the elements of their structure are moved only by external forces.

Acceleration detectors likewise depend upon passive elements which are moved by external forces. None of these detectors is known to have a positive means to improve the sensing ability of the detectors. Such a positive means would be useful in a myriad of devices in sensing not only acceleration, per se, but also in sensing its application to impact, shock and pressure waves.

SUMMARY OF THE INVENTION

The purpose of the instant invention is to provide an article that uses shape-memory alloy to provide a mechanical movement resulting from a pressure wave passing through the article, the pressure wave most commonly called a "shock wave", such shock wave most commonly due to a relatively high velocity impact.

Such an article is preferably a projectile having a velocity impacting a target. The desired mechanical movement is preferably that of expanding the nose of the projectile immediately upon impact. It is desirable that the article herein described not distort the projectile's balance or shape during launch or flight.

To accomplish this purpose the article provides positive means that will not distort the projectile's shape or balance during launch or flight, which means will cause the projectile to change shape immediately upon impact in order to increase said projectile's impact energy transfer efficiency against targets. This is possible through the use of shape-memory alloy which will exhibit a shape-memory effect, the article employing a thermal enhancement means to rapidly generate heat to improve and/or control the speed of recovery of the alloy, i.e., to generally initiate the shape-memory effect. The effect is the recovery of the shape-memory alloy which performs a controlled and defined mechanical movement.

In the case of soft targets this is accomplished by deforming the projectile (thus increasing the instability upon impact which causes tumbling), by increasing the projectile's diameter, or by increasing the projectile's frictional resistance. In the case of hard targets this is accomplished by deforming the projectile, thus increasing the penetration capability of the projectile. In general, a projectile is provided in accordance with the instant invention wherein the projectile is of shape-memory alloy, or wherein the projectile has a deforming means of shape-memory alloy, said deforming means being capable of altering the geometric shape of the projectile upon impact to improve the impact energy transfer efficiency of the projectile.

Accordingly, an aspect of the instant invention provides a projectile comprising: a core;

deforming means of shape-memory alloy in operative contact with said core, said deforming means altering the geometric shape of said core upon impact of the projectile due to the shape-memory effect exhibited by said alloy to improve the impact energy transfer efficiency of the projectile; and thermal enhancement means in operative thermal contact with said deforming means, said thermal enhancement means rapidly generating heat upon impact of the projectile to initiate said shape-memory effect.

Another aspect of the invention provides a projectile comprising:

a body portion of shape-memory alloy wherein said shape-memory alloy has a martensitic state and an austenitic state, said body portion being dimensionally deformed prior to impact while said shape-memory alloy is in its martensitic state, a change from its martensitic state to its austenitic state recovering said body portion upon impact, due to the shape-memory effect exhibited by said alloy, to its non-deformed dimension to alter the geometric shape of the projectile to improve the impact energy transfer efficiency of the projectile; and thermal enhancement means in operative thermal contact with said body portion, said thermal enhancement means rapidly generating heat upon impact of said projectile to initiate said shape-memory effect.

Yet another aspect of the invention provides a sabot comprising:

a plurality of body sections, said sections forming a cylinder having first and second ends, said sections pivotal with respect to each other at said first end of said cylinder in order to move the sections radially away from each other at said second end of the cylinder;

a ring of shape-memory alloy surrounding said sections near said first end of said cylinder, said shape-memory alloy having a martensitic state and an austenitic state, said ring being dimensionally deformed and radially expanded to surround said sections while said shape-memory alloy is in its martensitic state, a change from its martensitic state to its austenitic state recovering said ring to its non-deformed dimension due to the shape-memory effect exhibited by said alloy to pivot and to separate said sections;

thermal enhancement means in operative thermal contact with said ring, said thermal enhancement means comprising a material containing voids, collapse of said voids generating heat; and a pusher-plate in contact with said thermal enhancement means, said pusher-plate movable upon acceleration of the sabot, enabling said pusher-plate to crush the thermal enhancement means causing recovery of the ring and separation of the sections.

Another aspect of the invention provides a device of shape-memory alloy, said device containing voids, said shape-memory alloy having a martensitic state and an austenitic state, said device being dimensionally deformed while said shape-memory alloy is in its martensitic state, a change from its martensitic state to its austenitic state recovering said device to its non-deformed dimension, said voids enhancing the speed of recovery of said device by rapidly generating heat due to collapse of the voids when the device is subjected to shock.

Still another aspect of the invention provides a shock-sensitive switch comprising:

an element of shape-memory alloy, said shape-memory alloy having a martensitic state and an austenitic state, said element being dimensionally deformed prior to exposure to shock while said shape-memory alloy is in its martensitic state, a change from its martensitic state to its austenitic state recovering said element upon exposure to shock to its non-deformed dimension due to the shape-memory effect exhibited by said alloy to alter the geometric shape of said element; and indicating means in operative contact with said element, said indicating means being actuated by said element upon recovery of said element to its non-deformed dimension to signal such exposure to shock.

DETAILED DESCRIPTION OF THE INVENTION

Figure 1:
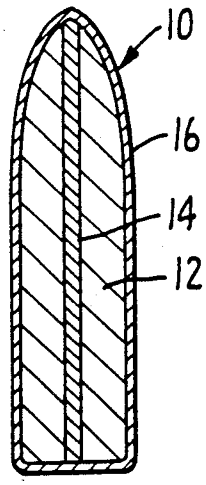
FIG. 1 is a full section view of an embodiment of the instant invention prior to impact of the projectile. The shape-memory alloy piece may optionally contain voids, or it may be in contact with thermal enhancement means comprising a piece which contains voids, as shown in phantom.

As described in the summary, the basic description of the instant invention discusses projectiles as a first example. After the basic theory has been explained other applications of the instant invention are described.

Projectiles according to the instant invention may be made entirely from shape-memory alloy, i.e., the projectile has a body portion made of shape-memory alloy, or the projectile may utilize a deforming means of shape-memory alloy which is capable of altering the geometric shape of the projectile upon impact to improve the impact energy transfer efficiency of the projectile. It is understood that the entire projectile may be made from shape-memory alloy. The entire projectile would then comprise the deforming means within the intended understanding of the term deforming means. In general, the deforming means will not distort the projectile's shape during launch or flight, rather it is a positive means which will cause the projectile to change shape immediately upon impact. The deforming means is preferably and economically used in combination with a heavy core material such as lead. It is within the scope of the invention to make the core itself entirely from shape-memory alloy. The core material may be unjacketed, fully encased, or partially encased within a metal jacket. Several embodiments of the instant invention having deforming means of shape-memory alloy are discussed hereinafter at length.

Materials, both organic and metallic, possessing shape-memory are well-known. An article made from such materials can be deformed from its original, heat-stable configuration to a second, heat-unstable configuration. The article is said to have shape-memory for the reason that it "remembers" its original shape. Upon application of heat alone to the article possessing shape-memory, it can be caused to revert, or to attempt to revert, from its secondary, heat-unstable configuration to its original, heat-stable configuration. Metallic alloys of this type are hereinafter referred to as "shape-memory alloys."

Among the metallic alloys, the ability to exhibit the shape-memory effect is a result of the alloy's being sensitive to temperature. A change in temperature causes such an alloy to undergo a reversible transformation from an austenitic state to a martensitic state. This transformation is sometimes referred to as a "thermoelastic martensitic transformation" or alternatively as "shape-memory effect". An article made from such a metallic alloy is easily deformed from its original, heat-stable configuration to a second, heat-unstable configuration when it is cooled. The cooled temperature must be below the point at which the alloy is transformed from the austenitic state to the martensitic state.

The temperature at which the metallic alloy commences the transformation is usually referred to as $M_s$, and the temperature at which the metallic alloy completes the transformation is usually referred to as $M_f$. When an article made from such a metallic alloy thus deformed is warmed to a temperature at which the alloy commences reverting to austenite, referred to as $A_s$, the deformed object will begin to return to its original, heat-stable configuration. ($A_s$ is the temperature at which the transformation is complete.) Also, the alloy is considerably stronger in its austenitic state than when in its martensitic state. The deforming means of the instant invention may be fabricated from nickel-titanium alloys. These alloys are well-known to those skilled in the art and are described in U.S. Pat. No. 3,351,463 which is incorporated herein by reference. Other literature describing the processing and characteristics of suitable compositions includes an article by Dr. William J. Buehler, the principal developer of 55-nitinol, and William B. Cross entitled "55 Nitinol—Unique Wire Alloy with a Memory", which appeared in the June, 1969 issue of *Wire Journal.* A description of the materials and certain of the properties may be found in the report by C. M. Jackson, H. J. Wagner and R. J. Wasilewski entitled "55-Nitinol—The Alloy with a Memory: Its Physical Metallurgy, Properties, and Applications" dated 1972 and published by the National Aeronautics and Space Administration. All of these publications are incorporated herein by reference. These binary shape-memory alloys are commercially available from a number of suppliers, one of which is Raychem Corporation in Menlo Park, Calif.

Other examples of shape-memory alloys are disclosed in U.S. Pat. Nos. 3,012,882; 3,174,851; 3,558,369; and 3,672,879, the disclosures of which are incorporated herein by reference. As made clear in these patents, these alloys undergo a transformation between an austenitic state and a martensitic state at certain temperatures. When they are deformed in the martensitic state, these alloys will retain this deformation. These alloys will revert to their original, non-deformed configuration when they are heated to a temperature sufficient to revert them to their austenitic state.

A significant aspect of the instant invention is the use of voids, either in the portions made of shape-memory alloy, or in a piece or pieces in contact with the portions made of shape-memory alloy. This aspect of the invention is useful in all embodiments of the invention, and is also useful in any device wherein extremely rapid or controlled recovery is desired.

Specifically, it is within the scope of the invention to utilize components of shape-memory alloy having voids therein or to utilize separate non-shape-memory alloy components with voids, which components are in contact with the components of shape-memory alloy, and which are herein defined as thermal enhancement means. Fabrication of the components with voids may be accomplished by the technique known to powder metallurgy wherein small particle grains of shape-memory alloy or of other material are held under temperature and pressure and, in essence, are sintered together. The desired porosity is accomplished by varying the size of the particles and the amount of pressure applied. Other methods of creating voids are well-known in the art, e.g., the mixing of the particles of shape-memory alloy or other material to contain voids with another material to obtain the desired voids.

The provision of voids enhances and can control the speed of recovery of the component. As applied to projectiles, or to a deforming means for a projectile, the voids are useful in rapidly generating heat upon impact due to the collapse of the voids being shocked.

The void-containing materials may be fabricated from a wide variety of materials. The specific method used to form the voids will depend upon the material selected. For example, if a metal such as aluminum or copper is selected, the previously described powder metallurgy method can be used. If a very high void content (very low-density) material is desired, then foaming techniques can be used. Materials other than metals that can be used include plastics, elastomers, ductile ceramics, and composite materials that can be formed with a void fraction.

The selection of the material and of the void-forming method is dependent upon the strength of the expected pressure wave and the temperature required for the device to operate correctly.

A projectile transfers energy to the object it strikes by means of momentum transfer through shock waves. However, at impact a shock wave is also transmitted into the projectile. This shock wave in the projectile generates heat and pressure in the projectile. The instant invention utilizes the shock wave generated within the projectile to trigger the deforming means of shape-memory alloy. Specifically, the heat and pressure generated by the shock wave raise the temperature of the alloy to the austenitic temperature discussed earlier. In several of the embodiments of the instant invention the deforming means of shape-memory alloy is located in the nose portion of the projectile. In these embodiments no shape change would occur during launch or flight. Upon impact the heat associated with the shock wave in the projectile would cause the shape-memory alloy deforming means to instantaneously alter the shape of the deforming means, thus altering the shape of the projectile. It is within the scope of the invention to optimize the shape change for each type of projectile in order to provide improved impact energy transfer efficiency to the target. Shape changes such as increasing the diameter result in increasing the resistance and point deformation which results in tumbling.

The impact of a projectile upon a material has been studied experimentally and analytically at several centers, principally the Material Technology Laboratory, the Ballistics Research Laboratory, and Washington State University. Others include the Los Alamos National Laboratory and the Lawrence Livermore National Laboratory. A book on the subject which is incorporated herein by reference is *High Velocity Impact Phenomena*, Academic Press, Inc., N.Y., (1970), edited by R. Kinslow, Library of Congress Catalog Card Number: 71-91425.

The above-referenced book at pages 293–417 illustrates the connection between velocity and the rise in pressure due to the impact shock wave in a material. A description of the calculation of the rise in temperature due to a shock wave is also given in this reference.

Following is a basic description which is understandable to a person skilled in the art of the method used to calculate pressure and temperature rises due to impact shock waves. The description is meant to be illustrative. The previous reference gives data for most metals, common alloys, and some other materials regarding the resultant pressure rises for such materials for varying impact velocities. The data is presented numerically. The locus of single shock states with varying shock strengths is called the "Hugoniot".

To obtain the shock wave pressure for a projectile impacting an object, first the Hugoniot curve for the projectile is reflected (mirror image), and then both the reflected projectile Hugoniot and the object Hugoniot are located in the pressure/projectile velocity plane. The intersection of the reflected projectile Hugoniot and of the object Hugoniot gives the pressure and particle velocity upon impact. The calculation is based upon the fact that the pressure and particle velocity of both the projectile and object are identical at the impact interface.

The previous reference explains how to calculate and also provides the data to calculate the temperature and pressure rises that will occur in the material of a projectile impacting another material at a known velocity. The impact pressure depends upon the consistency of the projectile material, the consistency of the material being struck, and the impact velocity of the projectile. For the purpose of this patent example, the following discussion concerns only a projectile impacting soft material, e.g., animal tissue, plastics, etc. The results can be divided into two groups: the first describing the projectile impact when the velocity is high (above 2 km/s), and the second describing the projectile impact when the velocity is low (below 1 km/s). In the projectile velocity range between 1 and 2 km/s, the results are dependent upon the consistency of the materials of the projectile and of the object being struck.

Generally, when a metal projectile for the first group has an impact velocity greater than 2 km/s, the impact shock wave will be strong enough to produce pressure rises on the order of 50 to 100 kbar and temperature increases on the order of 20 to 50 degrees C. The exact span of increase depends upon the consistency of the material of the projectile and of the object being struck. The previous reference describes the methods and provides data so the pressure and temperature rises can be calculated for this first group. A basic premise in those calculations is that the projectile material consists of high-density, void-free metal. The pressure and temperature rises for the first group will probably be sufficient to trigger the transformation between the austenitic and the martensitic phase in the shape-memory alloy.

The pressure and temperature rises for the second group will be much less, and are not expected to be sufficient to trigger the transformation between the austenitic and martensitic phase in the shape-memory alloy unless further design changes are made to enhance those rises. For example, a copper projectile impacting high-density (0.95) polyethylene at 1 km/s will have about a 36 kbar pressure rise and about a 15 degree C. temperature rise. Those rises would probably be insufficient to trigger the transformation between the austenitic and martensitic phase in the shape-memory alloy pieces in such a projectile. Projectiles of other high-density metals would have pressure and temperature rises similar to those for copper because these metals have only a small percentage compression at low-impact velocities, especially when impacting soft materials. Most rifle and pistol bullets have velocities in this range, that is below 1 km/s.

A method which allows the temperature in the projectile to be increased for a given impact velocity is to decrease the density of the material of the projectile, that is to increase the amount of void space in the metal. The reason this increases the temperature rise is that the voids collapse under the impact shock wave. That greatly increases the plastic work done, and that in turn causes more heat to be generated in the metal. For the example used previously, merely changing from no void space in the copper to 10% void space in the copper will cause the temperature to rise to about 62 degrees C. due to the impact shock wave.

As discussed earlier, there are several methods for creating voids in metals. One method which allows a precise control of the amount of void space in the metal is to start with metal powder that has a known particle size and then to hot-press the powder to form a piece having the desired void space content.

In summary, the instant invention example provides a piece of shape-memory alloy in the nose of the projectile wherein no shape alteration would occur during launch or flight. Upon impact the temperature rise due to the shock wave in the projectile would cause the shape-memory alloy piece to alter in shape. The shape alteration would be optimized for each type of projectile in order to provide improved impact energy transfer efficiency to the target. Shape changes such as increased diameter to increase resistance, and point deformation to cause tumbling, are examples.

Published data concerning impact mechanics, such as the previous references, point out that the impact shock wave attenuates as it travels from the point of impact along the length of the projectile. No shock wave should be expected beyond one projectile diameter back from the nose portion, or point of impact. The majority of projectiles are cylindrical so that the front center is the projectile nose, this being the intended point of impact. Therefore, all designs shown hereinbelow concentrate on having the deforming means of shape-memory alloy at the front center of the projectile. It is within the scope of the invention, however, to locate the deforming means at other locations within a projectile to perform a desired projectile shape change.

With continued reference to the drawing, FIG. 1 illustrates an embodiment of a generic projectile shown generally at 10, preferably comprising a core 12 and a deforming means 14. Generic projectile configurations are illustrated and described throughout the specification, but it is understood that the instant invention is applicable to a myriad of geometric configurations well-known to those skilled in the art. The projectile 10 is shown to be of conventional design and having a core 12 of heavy metal, such as lead, which is optionally but conventionally encased within a jacket 16.

The deforming means is formed of shape-memory alloy, and the deforming means is in operative contact with the core. In this embodiment the deforming means is contained within the core wherein the core has a longitudinal axis, and the deforming means comprises a generally cylindrically-shaped rod that is in general axial alignment with the axis. It is understood that the rod does not have to be a perfect right angle cylinder but could be tapered, etc., to increase the diameter of the rod along its length as desired. The deforming means may contain voids, or it may be in contact with thermal enhancement means comprising a piece 15 (shown in phantom) which contains voids.

The shape-memory alloy has a martensitic state and an austenitic state, and the deforming means is capable of being dimensionally deformed while the alloy is in its martensitic state into the cylindrically-shaped rod shown in the figure. While in its martensitic state, prior to impact of the projectile, the deforming means 14 remains in-column and is contained within the core.

Figure 2:
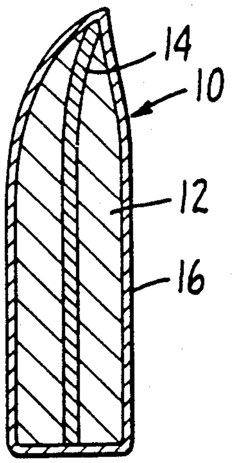
FIG. 2 is a view of the projectile shown in FIG. 1, the view revealing the projectile subsequent to impact after it has developed a curve along the length of its body.

FIG. 2 illustrates the projectile 10 subsequent to impact, i.e., after the temperature rise due to the impact shock wave has triggered the phase transition in the shape-memory alloy from its martensitic state to its austenitic state. As seen in FIG. 2, the deforming means 14 is capable of recovering upon impact to its non-deformed dimension, that of a bent or out-of-column rod. It can be seen that the out-of-column deforming means 14 has altered the geometric shape of the core 12 which will cause the projectile to tumble, thereby improving the impact energy transfer efficiency of the projectile.

The projectile 10 has thus been shown prior to impact in FIG. 1 in the smooth and symmetrical shape required for launch or flight. In FIG. 2 the projectile is shown subsequent to impact, after the temperature rise due to the impact shock wave has triggered the phase transition in the shape-memory alloy which then, in turn, deforms the projectile into a curved shape which will cause the projectile to tumble.

Figure 3:
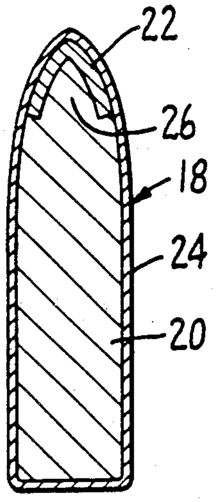
FIG. 3 is a full section view similar to FIG. 1 of a second embodiment of the invention prior to impact of the projectile. The shape-memory alloy piece may optionally contain voids, or it may be in contact with thermal enhancement means comprising a piece which contains voids, as shown in phantom.

FIG. 3 illustrates a second embodiment of a generic projectile 18 having a core 20 and a deforming means 22 of shape-memory alloy in operative contact with the core 20. The projectile 18 is further provided with an optional skin 24.

Figure 4:
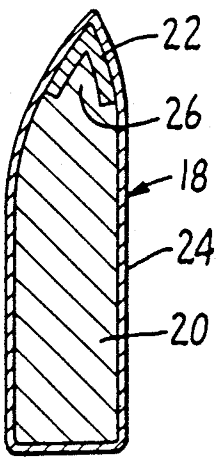
FIG. 4 is a view of the projectile shown in FIG. 3 subsequent to impact after said projectile has developed an off-center point.

In this embodiment, the core 20 again has a longitudinal axis and includes a nose portion 26. The deforming means 22 comprises a cap that is complementary to and in contact with the nose portion 26. It can be seen from the figure that the cap is symmetrical about the axis of the core with respect to the nose portion. The deforming means 22 is actually dimensionally deformed while in its martensitic state into this symmetrical configuration, a change from its martensitic state to its austenitic state capable of recovering the deforming means upon impact to its non-deformed dimension. Said non-deformed dimension is illustrated in FIG. 4 wherein the cap is capable of being asymmetrical about the axis with respect to the nose portion. The deforming means may contain voids, or it may be in contact with a separate thermal enhancement means 21 (shown in phantom) in the form of a piece which contains voids.

FIGS. 3 and 4 therefore show a projectile 18 which prior to impact is in the smooth and symmetrical shape required for launch or flight. The projectile is shown in FIG. 4 subsequent to impact, after the temperature rise due to the impact shock wave has triggered the phase transition in the shape-memory alloy. Such phase transition has deformed the nose portion 26 such that the point of the nose is not along the longitudinal axis of the core or of the projectile. That altered shape will cause the projectile to tumble subsequent to impact.

Figure 5:
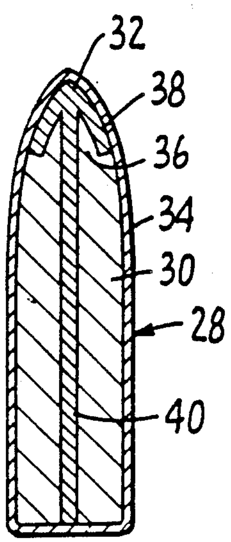
FIG. 5 is a full section view similar to FIG. 1 of a third embodiment of the invention prior to impact. The shape-memory alloy piece may optionally contain voids, or it may be in contact with thermal enhancement means comprising a piece which contains voids, as shown in phantom.

FIG. 5 illustrates a third embodiment of the instant invention wherein a generic projectile shown generally at 28 comprises a core 30 and a deforming means 32. Again, the core and the deforming means may be covered by an optional skin 34. In this embodiment the core 30 again has a longitudinal axis and includes a nose portion 36. The deforming means 32 comprises a cap 38 that is complementary to and in contact with the nose portion; it further includes a generally cylindrically-shaped rod 40 that is in general axial alignment with said axis. The deforming means may contain voids, or it may be in contact with a separate thermal enhancement means 35 (shown in phantom) in the form of a piece which contains voids.

Figure 6:
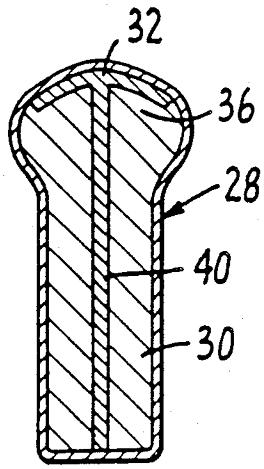
FIG. 6 is a view of the projectile shown in FIG. 5 subsequent to impact after said projectile has developed an enlarged diameter.

In this embodiment, the rod 40 of the deforming means 32 is deformed by increasing its length while the alloy of the deforming means is in its martensitic state. The deformed condition of the rod 40 is illustrated in FIG. 5. Upon impact and the resulting phase transition of the alloy from its martensitic state to its austenitic state, the rod 40 recovers and reduces in length to its original, non-deformed dimension, as seen in FIG. 6.

With reference to FIG. 5, the projectile 28 is shown prior to impact in the smooth and symmetrical shape required for launch or flight. In FIG. 6 the projectile is shown subsequent to impact, after the temperature rise due to the impact shock wave has triggered the phase transition in the shape-memory alloy of the deforming means. The phase transition then broadens the nose portion 36 and pulls the nose portion closer to the projectile base, in turn forcing the core 30 to flow radially outward, thus causing the projectile diameter to increase. The altered shape of FIG. 6 improves the impact energy transfer efficiency of the projectile.

All of the aforementioned projectiles have been illustrated as having a generic projectile shape and as having a core of malleable metal, as well as an optional skin. It is understood that it is within the scope of the invention to form the projectile into other known projectile configurations, with or without a skin, and further, to form a projectile wherein the deforming means comprises the core, with or without a skin, i.e., wherein the entire projectile is made from shape-memory alloy or wherein the projectile has a major body portion made of shape-memory alloy.

Figure 7:
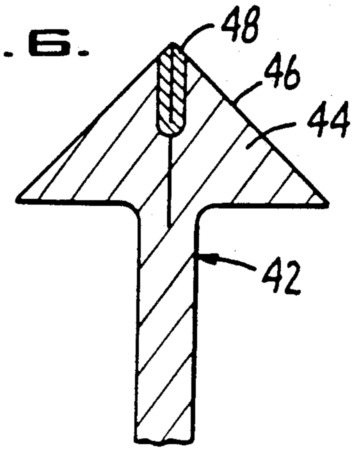
FIG. 7 is a full section view similar to FIG. 1 of a fourth embodiment of the invention prior to impact of the projectile. The view reveals the forward portion of a generic cutting projectile. The shape-memory alloy piece may optionally contain voids, or it may be in contact with thermal enhancement means comprising a piece which contains voids, as shown in phantom.
Figure 8:
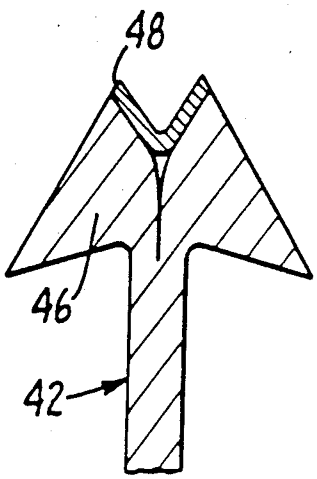
FIG. 8 is a view of the projectile shown in FIG. 7 subsequent to impact of the projectile after the cutting cross-section of said projectile has become enlarged.

FIG. 7 illustrates a fourth embodiment of the instant invention wherein a projectile shown generally at 42 has a core 44 having a longitudinal axis and includes a cutting head 46. The projectile 42 includes a shape-memory alloy deforming means 48 that is contained within the cutting head and which is in general axial alignment with the axis. A change of the alloy from its deformed martensitic state, as seen in FIG. 7, to its austenitic state, as seen in FIG. 8, is capable of radially expanding the cutting head 46 with respect to the axis, thereby increasing the cross-section of the cutting head. The deforming means may contain voids, or it may be in contact with a separate thermal enhancement means 47 (shown in phantom) in the form of a piece which contains voids.

FIG. 7 therefore shows the projectile prior to impact in the smooth and symmetrical shape required for launch or flight. In FIG. 8 the projectile is shown subsequent to impact, after the temperature rise due to the impact shock wave has triggered the phase transition in the shape-memory alloy of the deforming means. The phase transition has then separated the cutting head of the projectile into two or more sections which open outward at the point of the projectile, both increasing the projectile's cross-section and exposing more cutting edge. The expanded shape will cause the projectile to have increased lethality subsequent to impact.

Figure 9:
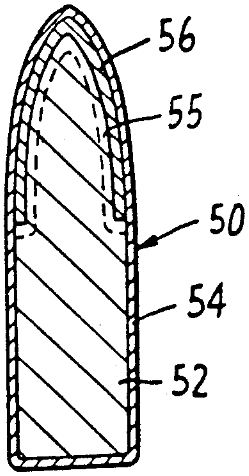
FIG. 9 is a full section view similar to FIG. 1 of a fifth embodiment of the instant invention prior to impact of the projectile. The view reveals a generic armor-penetrating projectile. The shape-memory alloy piece may optionally contain voids, or it may be in contact with thermal enhancement means comprising a piece which contains voids, as shown in phantom.

FIG. 9 illustrates a fifth embodiment of the instant invention wherein an armor-penetrating projectile shown generally at 50 comprises a core 52, a skin 54 surrounding the core 52, and a deforming means 56 positioned between the core 52 and the skin 54. The deforming means may contain voids, or it may be in contact with a separate thermal enhancement means 55 (shown in phantom) in the form of a piece which contains voids. In this embodiment the core 52 has a longitudinal axis, and the deforming means 56 has been radially expanded while the alloy is in its martensitic state to the configuration illustrated in FIG. 9. Upon impact, the deforming means goes through the transition phase from its martensitic state to its austenitic state and is capable of radially compressing the core 52 about the longitudinal axis to improve the armor penetration characteristics of the projectile.

Figure 10:
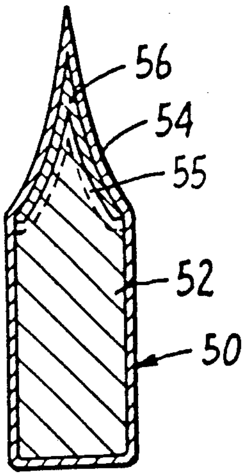
FIG. 10 is a view of the projectile shown in FIG. 9 subsequent to impact of the projectile after the diameter of the forward portion of said projectile has decreased.

FIG. 9 thus illustrates the projectile before impact in the smooth and symmetrical shape required for launch or flight. FIG. 10 illustrates the projectile subsequent to impact, after the temperature rise due to the impact shock wave has triggered the phase transition in the shape-memory alloy. The phase transition recovers the deforming means 56 to a reduced diameter at the front of the projectile to improve the armor penetration characteristics of the projectile.

Figure 11:
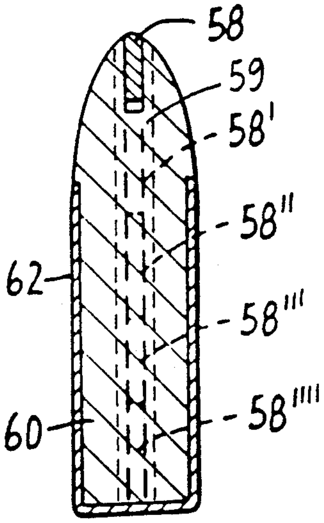
FIG. 11 is a full section view similar to FIG. 1 of a sixth embodiment of the instant invention prior to impact of the projectile. The view reveals a generic soft-nosed projectile. The shape-memory alloy piece may optionally contain voids, or it may be in contact with thermal enhancement means comprising a piece which contains voids, as shown in phantom.
Figure 12:
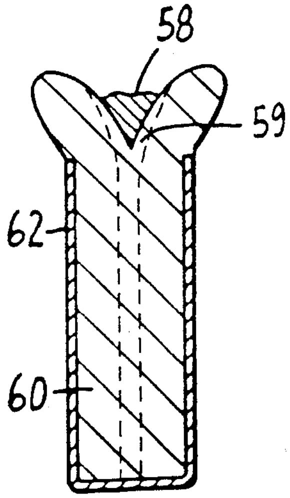
FIG. 12 is a view of the projectile shown in FIG. 11 subsequent to impact of the projectile after the soft-nosed portion of said projectile has expanded.

FIGS. 11 and 12 illustrate a generic soft-nosed projectile wherein the deforming means 58 is positioned in the nose of the core 60. The deforming means may contain voids, or it may be in contact with a separate thermal enhancement means 59 (shown in phantom) in the form of a piece which contains voids. The core 60 is preferably partially jacketed by a skin 62. As illustrated in FIG. 12, upon impact the core 60 is "mushroomed out" by the deforming means 58, which deforming means recovers to a larger diameter as it is driven deeper within the core 60 by the impact.

FIG. 11 also illustrates another aspect of the invention which is applicable to all embodiments of the invention. Multiple elements 58', 58'', 58''', and 58'''', shown in phantom, are made of shape-memory alloy. These elements may be made from different shape-memory alloys, may have different degrees of recovery, may have different void contents, or may be in contact with a separate thermal enhancement means 59 (shown in phantom) in the form of pieces containing voids, all to improve projectile impact energy transfer efficiency.

Figure 13:
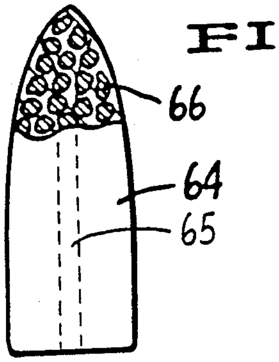
FIG. 13 is a partial cross-sectional view similar to FIG. 1 of a projectile prior to impact, said projectile being made entirely of shape-memory alloy, i.e., the projectile having a body portion made of the alloy, and further, wherein said projectile may optionally contain voids to enhance and/or control recovery of said projectile, or wherein it may be in contact with thermal enhancement means comprising a piece which contains voids, as shown in phantom.

FIG. 13 illustrates the general concept of fabricating the entire projectile 64 from shape-memory alloy, i.e., providing a projectile having a body portion of shape-memory alloy, as described earlier herein. This figure also illustrates the concept of fabricating the projectile 64 from shape-memory alloy materials containing voids, or the projectile's being in contact with thermal enhancement means 65 (shown in phantom) in the form of a piece which contains voids. It is understood that any of the embodiments discussed heretofore may also be fabricated from shape-memory alloy containing voids, or may be in contact with pieces containing voids.

Figure 14:
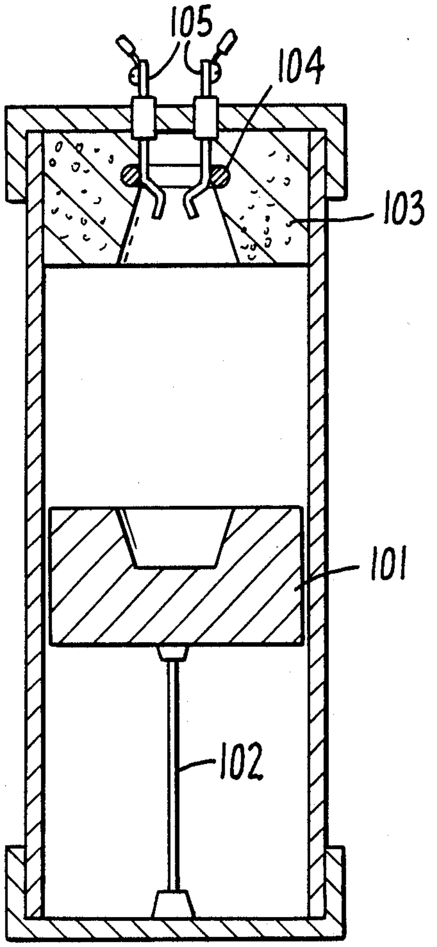
FIG. 14 is a full section view of a seventh embodiment of the instant invention, a shock-sensitive switch in the form of a one-axis accelerometer, prior to said switch being subjected to acceleration sufficient to activate said switch.

FIG. 14 illustrates another embodiment of the instant invention wherein a shock sensitive switch in the form of a one-axis acceleration detector is formed by arranging a weight 101 and a restraining means 102 such that the sensing of acceleration by the detector causes the weight to crush the thermal enhancement means 103 comprised of low-density, void-containing material, and the heat resulting from the collapse of the voids in the low-density material causes the recovery of the element 104 of shape-memory alloy. The movement of the element 104 of shape-memory alloy can be designed to actuate indicating means 105 in operative contact with said mechanical or electrical switch elements that would, for example, sound alarms, trigger passenger restraining devices, record the event, etc.

Figure 15:
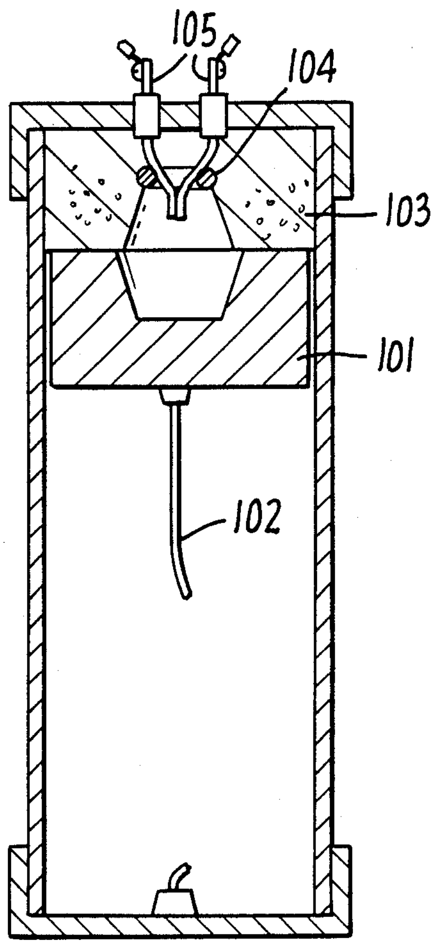
FIG. 15 is a view of the switch shown in FIG. 14 after the switch has been subjected to acceleration.

FIG. 14 shows the acceleration detector in its normal, inactivated state. FIG. 15 shows the acceleration detector subsequent to the sensation of acceleration having moved the weight sufficiently to crush the thermal enhancement means 103 of low-density material, causing the recovery of the shape-memory alloy.

Figure 16:
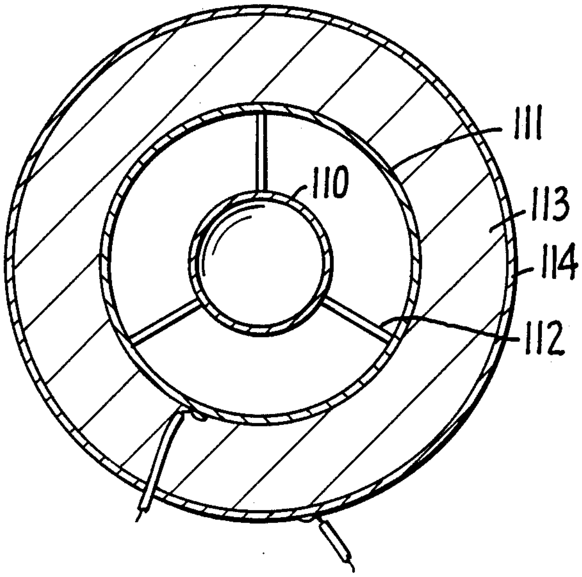
FIG. 16 is a full section view of an eighth embodiment of the invention, a shock-sensitive switch in the form of an all-axis acceleration detector, prior to the switch being subjected to acceleration sufficient to activate said switch.

FIG. 16 illustrates another embodiment of the instant invention wherein an all-axis acceleration detector is formed by a weight 110 which is suspended in the center of a first sphere 114 and a second concentrically mounted sphere 111, which is also called an indicating means, by a restraining means 112. The second inner sphere 111 is made of thin sheet metal. The thermal enhancement means 113 is made of an insulating material containing voids. The first sphere 114 comprises the element of shape-memory alloy. It is understood that the spheres 111 and 114 are electrically conductive or that the surfaces of the spheres which face each other may be coated with electrically conductive material.

Figure 17:
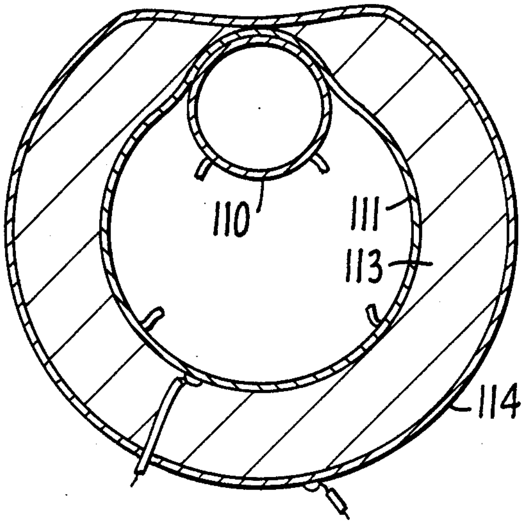
FIG. 17 is a view of the switch shown in FIG. 16 after the switch has been subjected to acceleration.

FIG. 16 shows the all-axis acceleration detector in its normal, inactivated state. FIG. 17 shows the acceleration detector subsequent to the sensation of acceleration having caused the weight to move. Such weight 110 has impacted the second sphere 111, denting a portion of the thermal enhancement means 113, collapsing voids in the thermal enhancement means. Such collapse of the voids has generated heat, causing the shape-memory alloy to recover the first sphere 114 in the region of the impact, displacing the thermal enhancement means 113, and completing an electrical circuit between the sheet metal sphere and the shape-memory alloy sphere. The completion of that electrical circuit can be designed to actuate mechanical or electrical devices that would, for example, sound alarms, trigger passenger restraining devices, record the event, etc.

Figure 18:
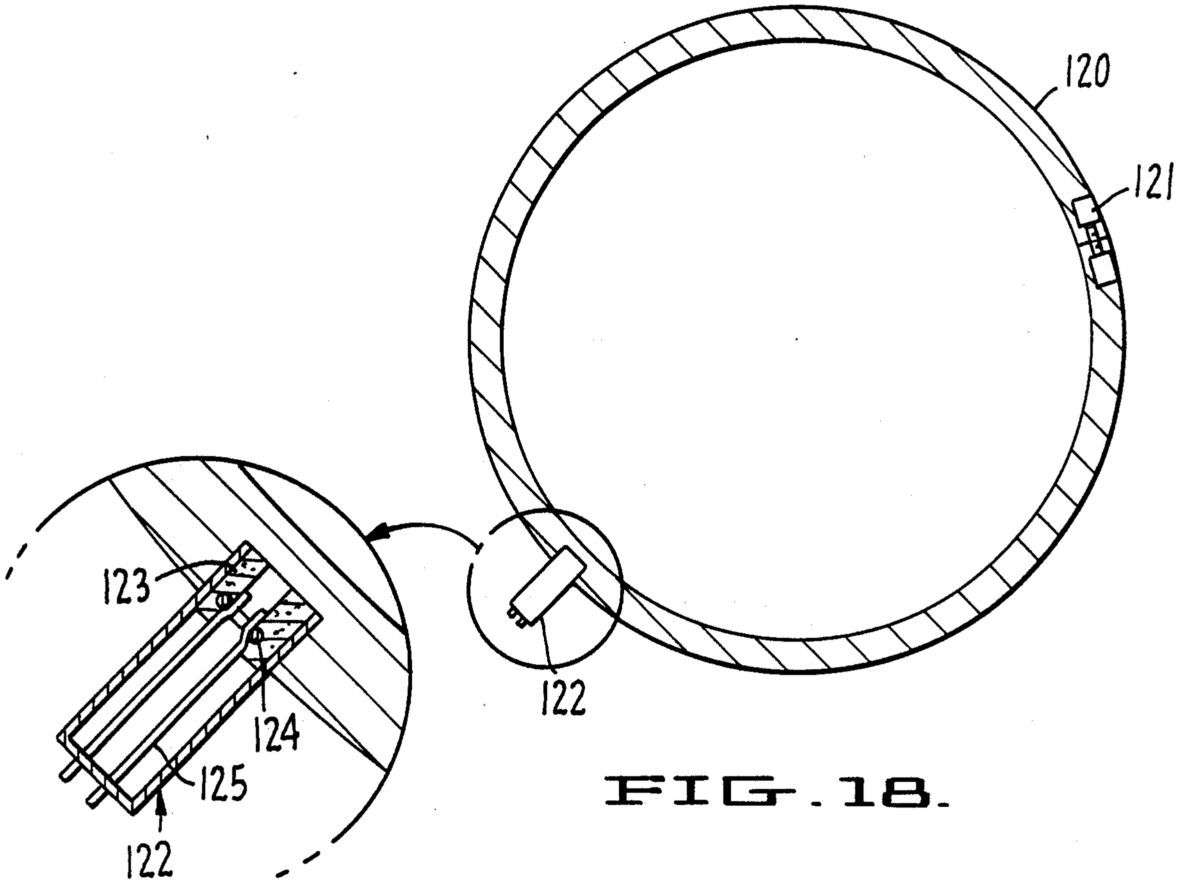
FIG. 18 is a partial cross-sectional view of a ninth embodiment of the invention, a shock-sensitive switch connected to a "band" to surround a component, such as a cylinder, to be monitored, said switch sensing and indicating a shock or pressure wave at the surface of a cylinder.

FIG. 18 illustrates another embodiment of the instant invention wherein the shock sensitive switch includes a band, preferably in the form of a mounting split band 120, with adjusting screw 121 holding one or more shock wave detector portions 122. The band 120 would be mounted around a cylinder, such as the barrel of a gun, and the adjusting screw 121 would be used to clamp and center the cylinder or barrel in the band, the shock wave detector portions 122 being in firm contact with the gun barrel. If the cylinder or gun barrel diameter expands or contracts due to thermal conditions, the mounting band will expand and contract with the barrel. However, when the barrel swells rapidly, as when gas pressure drives a projectile down the barrel, the rapid swelling will collapse the voids in the thermal enhancement means 123 of low-density material in the shock detector, and the collapse of the voids will generate sufficient heat to actuate the phase transition in the element 124 of shape-memory alloy shown to be in the form of a continuous or discontinuous ring. The physical movement associated with the recovery of the ring of shape-memory alloy can be designed to actuate indicating means 125 in the form of mechanical or electrical devices to sound alarms, trigger passenger restraining devices, record the event, etc. The indicating means 125 is shown to be a pair of electrical elements which are electrically interconnected by the recovery of the ring to a smaller diameter coinciding with a change of the alloy to its austenitic state. It is understood that the ring of shape-memory alloy is electrically conductive and closes the circuit by contacting the pair of electrical elements.

Current use of sabots to launch rod penetrators at high velocity requires that the rod and the sabot separate immediately after the rod-sabot assembly leaves the launch tube. Designs which rely upon either centrifugal force or air resistance to separate the rod and sabot are not totally reliable, in that the rod and sabot do not always separate cleanly. When there is no clean separation the rod is perturbed during flight, with resultant loss of velocity and/or accuracy and/or impact energy transfer efficiency. A mechanism is required that (1) has a long shelf life, (2) can withstand the launch environment, (3) is highly reliable, and (4) causes the sabot to open smoothly and evenly immediately after the sabot leaves the launch tube.

Figure 19:
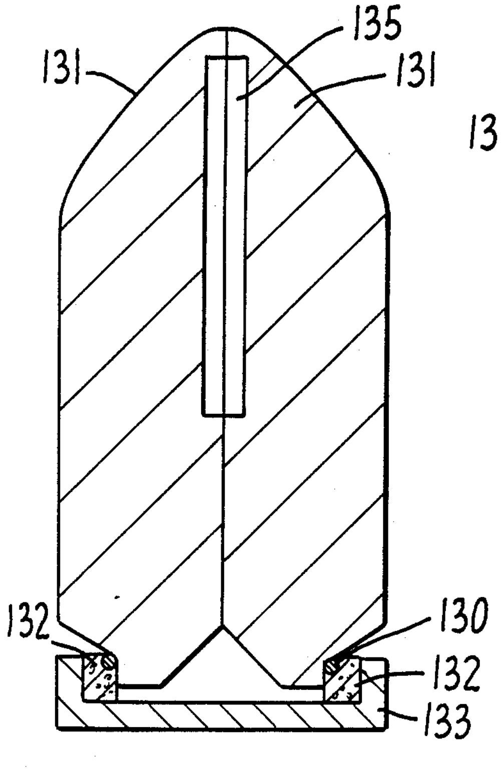
FIG. 19 is a full section view of a tenth embodiment of the invention, a sabot with an opening device prior to its being actuated by firing gas pressure.

FIG. 19 illustrates another embodiment of the instant invention wherein a sabot opening device is formed by arranging a deforming means in the form of a ring 130 of shape-memory alloy onto the tapered, rear-end of the body sections 131 of the sabot, such ring 130 being in intimate contact with a thermal enhancement means 132 containing voids, and a pusher-plate 133 transferring gas pressure to the assembly.

Figure 20:
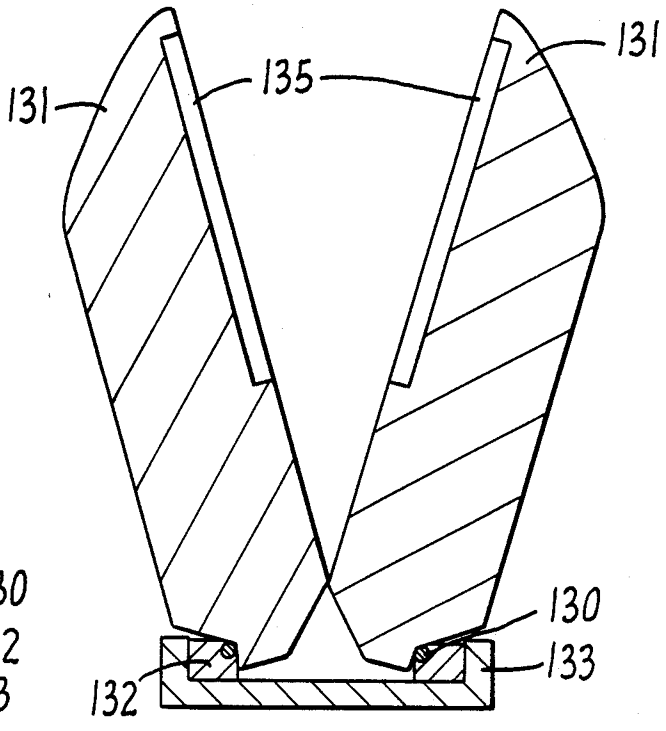
FIG. 20 is a view of the sabot shown in FIG. 19 after the sabot opening device has been actuated by firing gas pressure.

FIG. 19 shows a sabot opening device in its normal, inactivated condition. FIG. 20 shows the same sabot opening device subsequent to the gas firing pressure having collapsed the voids in the thermal enhancement means 132. Such collapse of the voids generated sufficient heat to cause the ring 130 of shape-memory alloy to recover to a smaller diameter, and that motion, as transmitted by the shape of the sabot device, caused the body sections 131 of the sabot to open.

FIGS. 19 and 20 show the construction and operation of the sabot opening device. As shown in FIG. 19, the body of the sabot is a cylinder separated along its long axis into four equal sections 131. The first end of the sabot has a cavity 135 to hold the penetrator rod; the second end has been shaped to hold a ring 130 made of shape-memory alloy. The second end with the ring has also been drilled out so that said sections will pivot with respect to each other when the shape-memory alloy ring recovers to a smaller diameter. The force the ring generates is transmitted to the sabot sections as an opening force.

The thermal enhancement means 132 is a piece of low-density material (containing small voids), which is fitted around the shape-memory ring 130 and is in thermal contact with the ring with an undefined outer surface. The outer surface is expected to vary for each application. When the propellant begins to accelerate the sabot, a pusher-plate 133 is forced against the thermal enhancement means 132 while inertia and friction resist the movement of the sabot. The resultant forces collapse the voids in the low-density material and raise its temperature. The heat in the thermal enhancement means 132 of low-density material heats the shape-memory ring 130, the ring 130 shrinks to its smaller diameter, and the sabot is subjected to an opening force, as shown in FIG. 20. This process can be accomplished while the sabot is still in a normal (2-foot long) launch tube (barrel). The heat transfer from the low-density material to the ring can be varied by changing the physical design, so that the opening time can be controlled within some range.

While the preferred embodiments of the present invention have been described, it should be understood that various changes, adaptations, and modifications may be made therein without departing from the spirit of the invention and the scope of the appended claims.

What is claimed is:

1. A shock-sensitive switch comprising:

an element of shape-memory alloy, said shape-memory alloy having a martensitic state and an austenitic state, said element being dimensionally deformed prior to exposure to shock while said shape-memory alloy is in its martensitic state, a change from its martensitic state to its austenitic state recovering said element upon exposure to shock to its non-deformed dimension due to the shape-memory effect exhibited by said alloy to alter the geometric shape of said element; and indicating means in operative contact with said element, said indicating means being actuated by said element upon recovery of said element to its non-deformed dimension to signal such exposure to shock.

2. A switch as in claim 1 wherein said element contains voids, said voids affecting the recovery of said element, collapse of said voids upon exposure of said element to shock generating heat to initiate the shape-memory effect.

3. A switch as in claim 1, further including thermal enhancement means in operative thermal contact with said element, said thermal enhancement means comprising a material containing voids, collapse of said voids upon exposure of said thermal enhancement means to shock generating heat to initiate the shape-memory effect.

4. A switch as in claim 3 including a band connectable to surround a component to be monitored, said thermal enhancement means and said element connected to said band and a component to be monitored, radial expansion of such a component crushing said thermal enhancement means, thereby recovering said element and actuating said indicating means to signal radial expansion of such a component to be monitored.

5. A switch as in claim 3 further comprising:

a weight;

restraining means operably connected to said weight securing said weight against movement, said restraining means allowing said weight to move upon exposure of said restraining means to shock, said weight contacting said thermal enhancement means upon movement of said weight, thereby crushing said voids, causing recovery of said element upon a change of the alloy to its austenitic state and actuating said indicating means.

6. A switch as in claim 5 wherein said element comprises a first sphere, and said indicating means comprises a second sphere concentrically mounted within said first sphere, said first sphere being spaced and electrically insulated from said second sphere, said thermal enhancement means being positioned between said spheres, said weight being concentrically contained within said second sphere and being restrained from contact with said second sphere by said restraining means, said restraining means allowing said weight to contact said inner sphere upon exposure of said restraining mean to shock, said weight crushing said second sphere and said thermal enhancement means, recovering said first sphere to move a portion of said first sphere radially inwardly to its non-deformed dimension to make electrical contact with said second sphere, providing a signal of exposure to shock.

* * * * *